United States Patent [19]

Britt

[11] Patent Number: 4,461,929
[45] Date of Patent: Jul. 24, 1984

[54] AMPLIFIER FOR ELECTRONIC AND ELECTRO-MECHANICAL TRANSMITTERS

[75] Inventor: Roger W. Britt, London, Canada

[73] Assignee: Northern Telecom Limited, Montreal, Canada

[21] Appl. No.: 423,619

[22] Filed: Sep. 27, 1982

[51] Int. Cl.³ .............................................. H04M 1/00
[52] U.S. Cl. .................................. 179/81 B; 179/81 R
[58] Field of Search .................. 179/81 B, 81 R, 70, 179/77, 16 F; 381/120, 113, 122, 112

[56] References Cited

U.S. PATENT DOCUMENTS 4,354,060 10/1982 Niertit et al. ........................ 179/81 R Primary Examiner—G. Z. Rubinson
Assistant Examiner—James L. Dwyer
Attorney, Agent, or Firm—Sidney T. Jelly

[57] ABSTRACT

A handset for a telephone set is provided with a receive amplifier which is compatible with both electronic and electro-mechanical telephones, that is telephones having electro-mechanical transmitters and telephones having electronic transmitters. The operational amplifier is powered from the telephone line, from the power input to the telephone network, and is driven via an impedance matching circuit exhibiting a low AC impedance and having a capacitor to short out AC signals such as voice signals on the telephone line and a special transistor which has high AC impedance and low DC resistance to block out AC signals and provide DC power. The operational amplifier is of special characteristics, stabilized to work down to very low voltages, e.g. 1.1 volts and also capable of operating at higher voltages, e.g. 20 volts.

9 Claims, 3 Drawing Figures

AMPLIFIER FOR ELECTRONIC AND ELECTRO-MECHANICAL TRANSMITTERS

This invention relates to a receive amplifier, and associated circuitry, for telephone and smiliar handsets and which amplifier is compatible for both handsets having an electro-mechanical transmitter and handsets having an electret microphone and associated with an electronic telephone, and other telecommunications apparatus.

In previous arrangements, it was possible to obtain power, for an amplifying circuit, and volume control circuit, by tapping off from the transmitter leads. While this can still be done for electro-mechanical transmitters, it is not possible to do this with electret transmitters. Apart from the problems of sufficient power, any attempt to tap the electret transmitter leads will seriously affect the operation of the electret transmitter.

However, for cost and other reasons it is desirable to have a receive amplifier arrangement which is compatible with either type of handset, and associated telephone set. It is desirable to provide an amplifier circuit which can be placed in a handset, or provide a handset with the unit installed, which is quickly and easily adapted to suit a standard telephone set using a handset with an electro-mechanical transmitter, or an electronic telephone set with a handset having an electret transmitter.

There are considerable differences between electro-mechanical and electret transmitters and standard and electronic telephones. Terminals are different, and there are differences in operation, signal leads, power supply leads, and other features.

The present invention uses a separate power supply taken off of the network. The power supply is from the telephone line and is in parallel with the telephone set. Various novel circuits are provided to effect a satisfactory power level, avoid over-voltages, provide impedance match and other features. A volume control can also be provided.

The amplification circuit is then independent of the transmitter characteristics, being adaptable for variable characteristics.

The arrangement is cost effective as the telephone company does not need to have two different arrangements. It does not matter which type of telephone set an installer meets, he can install the special handset, using a six conductor cord instead of a four conductor cord.

The invention will be understood by the following description of an embodiment, by way of example, in conjunction with the accompanying drawings, in which.

Figure 1:
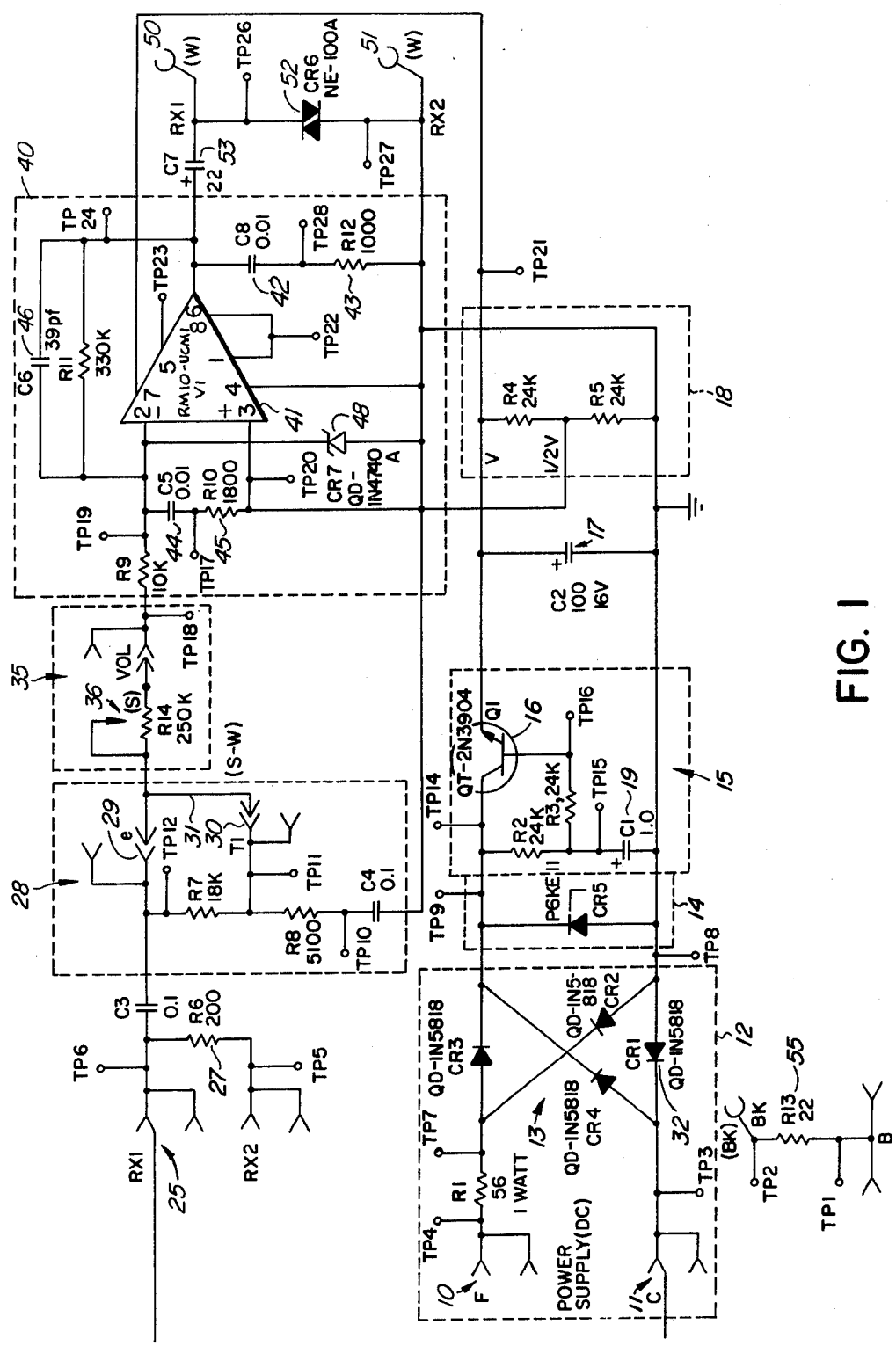
FIG. 1 is a circuit of power supply, volume control, amplifier and associated items.

Considering the circuit diagram of FIG. 1, this can be split up into several sections or parts, and as such the figure will be described, the whole dividing into two major parts, the power supply and the signal control and amplification.

Firstly, the power supply is, as previously stated, taken off the network, via inputs 10 and 11, 10 being generally the Tip and 11 the Ring. The power supply part has a first section generally within the dotted line area 12, and includes a Schotky bridge at 13. This arrangement is important in order to provide a suitable power supply independent of the transmitter type. In an electro-mechanical telephone the voltage available can be as low as 2 volts, such as on a long loop, or two telephone sets in parallel and both "off hook". The voltage range can easily vary between 2 and 10 volts. For an electronic telephone there is always at least 5 volts, generally varying between 5 and 7 volts. It is therefore desirable, even if not essential, to provide a more regulated voltage to the amplifier circuit. This is obtained by the power supply section 12.

Following power supply section 12 is a transorb 14. This limits or absorbs ranges above about 13 volts, such as may occur due to lightning strikes.

The transorb 14 is followed by an impedance matching sub-circuit or section 15. The sub-circuit exhibits a low AC impedance and, through capacitor 19, shorts out AC signals, such as voice signals, on the line. The sub-circuit includes a special transistor 16, having a high AC impedance and a low DC resistance and which blocks the AC signals on the line yet provides DC power to the amplifier circuit. This transistor is particularly important and must have the right characteristics. It is a difficult item and a typical transistor is indicated on the drawing.

The filter capacitor 17 stores DC energy and acts as a reservoir to meet any peak demands from the circuit.

Section 18 is a voltage divider to drive the Op Amp, described later, into its operating region.

The signal control and amplifier circuit are connected to the receiver part of the network at an input end and to the receiver at the output end, that is inserted between network and receiver. The signal to be amplified is supplied to terminal 25 and to a single connection to the power supply input, terminal 11. A resistor 27 acts to provide an apparent presence of a receiver—to satisfy the receiver port.

There follows a resistor divider circuit, at 28, which acts to adjust the amplitude of the input signal. The amplitude of the signal obtained at terminal 25 in an electronic telephone set is lower than the signal arriving at terminal 25 in an electro-mechanical telephone, due to the difference in electrical connections in the network. The circuit 28 has two outputs, at 29 and 30, output 29 being for an electronic telephone and 30 for an electro-mechanical telephone. A telephone handset, with a compatible receiver amplifier, and also with a volume control, that is with the circuit of FIG. 1, is supplied with the connection made to output 30 by the conductor or lead 31, and with an electro-mechanical transmitter in the handset. When the installer meets an electronic telephone, the lead 31 is disconnected from 30 and connected to 29. At this time it will also be necessary to change the transmitter to an electronic transmitter, e.g. an electret transmitter. The output connections are adjacent to the cup which receives the transmitter and are conveniently in the form of "quick connects"—female terminals which accept spade terminals on the lead 31. The loose cup in the transmitter end of the handset is changed together with the transmitter to suit the electronic telephone. A return to the Ring line of the input eventually occurs via diode 32 in the power supply sub-circuit 12.

In the example illustrated, the resistance divider circuit 28 is followed by a volume control 35, which is a normal rheostat, indicated at 36, with associated circuitry of conventional form. From the volume control the signal passes to the Operational Amplifier (Op Amp) sub-circuit, indicated generally at 40. It is possible to omit the volume control if such is not required.

The Op Amp circuit 40 is of inverter Op Amp configuration of normal arrangement, but the Op Amp 41 itself is of very special form, or characteristics. It is an Op Amp which will work down to very low voltages, for example 1.1 volt DC. Various losses in the circuitry from the power supply input at 10 and 11 reduce the lowest level of input, approximately 2 volts, down to about 1.1 volts at the Op Amp.

The Op Amp is used in a high gain form with variable impedance input and an inductive loading (from the receiver), and unless properly compensated will act as an oscillator. It is stabilized as an Op Amp by the various subsidiary circuits—capacitor 42 and resistor 43; capacitor 44 and resistor 45; and capacitor 46. The maximum overall gain is of the order of 25 dB SPL. The Op Amp, broadly, is stabilized to operate at low voltages but capable of operating at higher voltage. The receiver, of the telephone set, is an inductive load, and tends to destabilize the Op Amp. The Op Amp uses the minimum number of transistors, to be capable of working down to the low voltage, i.e. 1.1 volts. The Op Amp is designed to work down to this voltage, and is supplied by National Semiconductor Corporation, under the No. QM10-UCM1, as indicated in FIG 1. The ability to work down to 1.1 volts is a unique characteristic, other Op Amps requiring above 3.0 volts minimum. The range of voltage can be up to about 20 volts, or more.

The diode 48, is a zener diode, and provides static protection. Depending upon the design of the installation, this diode is another item which may be omitted.

The output from the Op Amp circuit 40 is fed to the output terminals 50 and 51. A varistor 52 is connected between the output terminals. Normally a varistor is fitted on a receiver, but in some cases the electronic telephone receiver does not have one and therefore the varistor 52 is provided. It would be omitted if a varistor was always provided on the receivers. The varistor limits the electric power applied to the receiver, and therefore limits the sound pressure output from the receiver. The fact that there may be two varistors in parallel does not affect the signal more than a single varistor. Capacitor 53 permits passage of AC signals only.

For an electro-mechanical transmitter, with a powdered carbon electrode, the resistance of the transmitter decreases with age. A resistor 55 is connected, in series with the transmitter, and this gives an increased Tip and Ring Voltage. The effect of this is to increase the voltage available for the power supply. Normally such a resistor is provided in all handsets but is not connected for an electret transmitter and electronic telephone. The connection of resistor 55 is seen in FIG. 2, while in FIG. 3 it is seen non-connected.

Figures 2, 3:
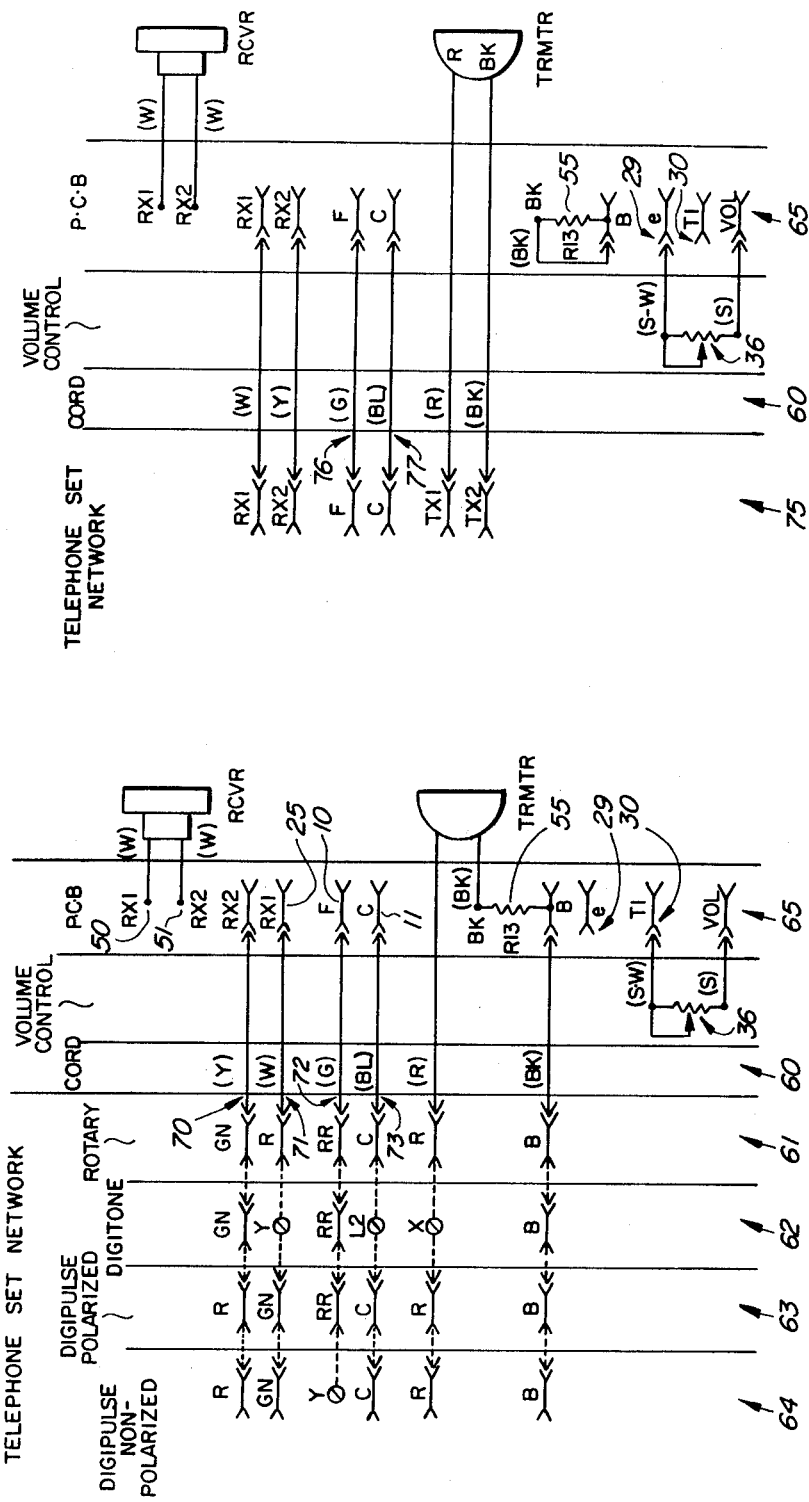
FIG. 2 is an illustration of the handset connections for an electro-mechanical transmitter telephone.
FIG. 3 is an illustration of the handset connections for an electronic telephone, with an electret transmitter.

FIGS. 2 and 3 illustrate the alternative connections for the six conductor handset cord for electro-mechanical telephones, FIG. 2, and electronic telephones, FIG. 3.

In FIG. 2 the cord is indicated at 60 with the six conductors colour coded (BK)-black, (R)-red, (BL)-blue, (G)-green, (W)-white, and (Y)-yellow. This colour coding is conventional. Depending upon the type of dial provided in the electro-mechanical telephone so the connectors to the telephone set network can vary. Thus, the various alternative network connections for various dials are indicated at 61, 62, 63 and 64. The printed circuit board, carrying the various components for the circuits illustrated in FIG. 1, is indicated at 65. Various connections and components corresponding to such connections and components are shown in FIG. 1, and also shown for the PCB in FIG. 2, for example outputs 50 and 51, the connection to the volume control and the additional resistor 55. The volume control 36 is also shown in FIG. 2.

Previous handsets, with electro-mechanical transmitters, and with amplification and volume control, used a four conductor handset cord, and power for the amplifier circuit was obtained by tapping at terminals 70 and 71, i.e. from the transmitter leads, as stated previously. For a compatible handset, the power supply is obtained by tapping at terminal 72, which corresponds to input 10 in FIG. 1, and at terminal 73, which corresponds to input 11 in FIG. 1.

For the electronic telephone with an electret transmitter, the printed circuit board is again indicated at 65 in FIG. 3, and the cord at 60. A single telephone set network is indicated, at 75, only one type of dial being provided. The power supply is tapped from terminals 76 and 77, these terminals corresponding to inputs 10 and 11 of FIG. 1.

What is claimed is:

1. In a telephone set having a base and a handset, said base including a telephone network and means for connecting a telephone line to said network, said telephone line providing a power supply to said network and said handset including a receiver;

a receive amplifier mounted in said handset, said receive amplifier being compatible with both electronic and electro-mechanical transmitters, said receive amplifier comprising:

a power supply circuit having an input and means connecting the input of the power supply circuit to the power supply of said network in parallel with the network; an operational amplifier driven by a power supply from said power supply circuit, said operational amplifier being in series with said power supply circuit and the receiver; means for supplying a signal to an input of the operational amplifier and including a signal amplitude adjuster circuit having two alternate outputs, a first output for use with an electronic transmitter and a second output for use with an electro-mechanical transmitter, said operational amplifier being connected selectively to one of said outputs, said operational amplifier being stabilized to operate at low voltages down to about 1.1 volts and capable of working at higher voltages up to at least about 20 volts, and means connecting the output of the operational amplifier to the receiver.

2. Apparatus as claimed in claim 1, including a capacitor and a resistor in series across the input of said operational amplifier, a capacitor and a resistor in series across the output of the operational amplifier, and a capacitor in parallel with the operational amplifier, between the input and the output, for stabilization of the operational amplifier, and including an impedance matching circuit in said power supply circuit exhibiting a low AC impedance and including a transistor having a high AC impedance and low DC resistance, said transistor blocking AC signals arriving from the telephone line and providing DC power to the operational amplifier, and further including a capacitor for shorting out AC signals on the connection from the telephone line.

3. Apparatus as claimed in claim 1, said power supply circuit including a Schotky bridge circuit for stabilizing the power supply.

4. Apparatus as claimed in claim 1, including a transorb connected across the power supply to limit voltages in said power supply above 13 volts.

5. Apparatus as claimed in claim 3, including an impedance matching circuit between said Schotky bridge circuit and the power input to said operational amplifier, said impedance matching circuit exhibiting a low AC impedance and including a transistor having a high AC impedance and low DC resistance, said transistor blocking AC signals arriving from the telephone line and providing DC power to the operational amplifier, and further including a capacitor for shorting out AC signals on the connection from the telephone line.

6. Apparatus as claimed in claim 5, including a filter capacity across the power supply from the impedance matching circuit, to store DC energy.

7. Apparatus as claimed in claim 5, including a voltage divider across the power supply from the impedance matching circuit, the output from the voltage divider connected to the operational amplifier.

8. An amplifier as claimed in claim 1, including a volume control circuit between the output of the amplitude adjuster circuit and the input of the operational amplifier.

9. An amplifier as claimed in claim 1, said operational amplifier stabilized by a capacitor and resistor in series across the input; a capacitor and resistor in series across the output; and a capacitor in parallel with the amplifier, between the input and the output.

* * * * *